United States Patent
Meyer et al.

(10) Patent No.: US 9,036,912 B2
(45) Date of Patent: May 19, 2015

(54) METHOD, SYSTEM, DIGITAL CAMERA AND ASIC FOR GEOMETRIC IMAGE TRANSFORMATION BASED ON TEXT LINE SEARCHING

(75) Inventors: Hans Christian Meyer, Oslo (NO); Mats Stefan Carlin, Gjettum (NO); Knut Tharald Fosseide, Trollasen (NO)

(73) Assignee: LUMEX AS, Oslo (NO)

(*) Notice: Subject to any disclaimer, the term of this patent is extended or adjusted under 35 U.S.C. 154(b) by 1582 days.

(21) Appl. No.: 11/915,948

(22) PCT Filed: May 19, 2006

(86) PCT No.: PCT/NO2006/000189
§ 371 (c)(1),
(2), (4) Date: Mar. 6, 2008

(87) PCT Pub. No.: WO2006/130012
PCT Pub. Date: Dec. 7, 2006

(65) Prior Publication Data
US 2009/0016606 A1    Jan. 15, 2009

(30) Foreign Application Priority Data
Jun. 2, 2005 (NO) .................................. 20052656

(51) Int. Cl.
*G06K 9/00* (2006.01)
*G06K 9/32* (2006.01)
*G06K 9/42* (2006.01)

(52) U.S. Cl.
CPC .............. *G06K 9/3283* (2013.01); *G06K 9/42* (2013.01)

(58) Field of Classification Search
USPC .................................. 382/181–231
See application file for complete search history.

(56) References Cited

U.S. PATENT DOCUMENTS

| | | | |
|---|---|---|---|
| 5,245,676 A * | 9/1993 | Spitz ............................ 382/235 |
| 5,491,759 A * | 2/1996 | Nagao et al. ................... 382/199 |
| 5,513,277 A * | 4/1996 | Huttenlocher ................ 382/171 |
| 5,539,841 A * | 7/1996 | Huttenlocher et al. ....... 382/218 |
| 5,563,403 A | 10/1996 | Bessho et al. |
| 5,689,585 A | 11/1997 | Bloomberg et al. |
| 5,708,717 A | 1/1998 | Alasia |
| 5,818,978 A | 10/1998 | Al-Hussein |
| 6,304,313 B1 | 10/2001 | Honma |

(Continued)

FOREIGN PATENT DOCUMENTS

| EP | 1276074 A2 | 1/2003 |
|---|---|---|
| EP | 1276074 A3 | 1/2003 |

(Continued)

OTHER PUBLICATIONS

Zhang, Zheng; Tan, Chew Lim "Correcting Document Image Warping Based on Regression of Curved Text Lines" International Conference on Document Analysis and Recognition, ICADR-2003.

(Continued)

*Primary Examiner* — Alex Liew
(74) *Attorney, Agent, or Firm* — Volpe and Koenig, P.C.

(57) ABSTRACT

The present invention provides a method, system and/or a digital camera providing a geometrical transformation of deformed images of documents comprising text, by text line tracking, resulting in an image comprising parallel text lines. The transformed image is provided as an input to an OCR program either running in a computer system or in a processing element comprised in said digital camera.

4 Claims, 6 Drawing Sheets

(56) References Cited

U.S. PATENT DOCUMENTS

| | | | |
|---|---|---|---|
| 2003/0026482 A1 | 2/2003 | Dance | |
| 2003/0086615 A1 | 5/2003 | Dance et al. | |
| 2003/0202696 A1* | 10/2003 | Simard | 382/195 |
| 2005/0216564 A1 | 9/2005 | Myers et al. | |
| 2005/0225808 A1* | 10/2005 | Braudaway et al. | 358/3.26 |
| 2006/0291727 A1* | 12/2006 | Bargeron | 382/218 |

FOREIGN PATENT DOCUMENTS

| | | |
|---|---|---|
| RU | 2176823 C2 | 12/2001 |
| RU | 2256225 C2 | 12/2003 |
| WO | 0044181 A1 | 7/2000 |
| WO | 0126032 A1 | 4/2001 |

OTHER PUBLICATIONS

Wu, Changhua; Agam, Gady "Document Image De-Warping for Text/Graphics" International Symposium on Statistical Pattern Recognition, SSPR-2002.

Cao et al. "Rectifying the bound document image captured by a camera: A model based approach" International Conference on Document Analysis and Recognition, ICADR-2003.

Pilu, Maurizio "Deskewing perspectively distorted documents: An approach based on perceptual organization" HP Technical Report HPL-2001-100, May 2, 2001 pp. 1-14 XP002535255.

Lavialle O et al. "Active Contours Network to Straighten Distorted Text Lines" Proceedings. 2001 International Conference on Image Processing Oct. 7-10, 2001, vol. 3, pp. 748-751, DOI 10.1109/ICIP. 2001.958227. See Figures 1, 5 7 and abstract.

Ittner, D.J. and Baird, H.S., "Language-Free layout analysis", Proc., IAPR 2nd Int'l Conf.on Document Analysis & Recognition, Tsukuba Science City, Japan, pp. 336-340, Oct. 1993.

Breuel T.M., "Robust least square baseline finding using a branch and bound algorithm", In Proceedings of SPIE/IS&T 2002 Document Recognition & Retrieval IX Conf. (DR&R IX), pp. 20-27, San Jose, California, USA, Jan. 2002.

* cited by examiner

Figure 2

METHOD, SYSTEM, DIGITAL CAMERA AND ASIC FOR GEOMETRIC IMAGE TRANSFORMATION BASED ON TEXT LINE SEARCHING

FIELD OF INVENTION

The present invention is related to Optical Character Recognition (OCR) systems, and especially to a method, system or digital camera comprising said method for geometric image transformation of deformed images of text based on text line searching.

BACKGROUND

In prior art the flat bed scanner has become a standard equipment in almost every office providing scanned input of typed text, book pages and different types of documents such as for example handwritten applications or partially handwritten schemes etc. to computers for further word-processing, electronic storage, electronic distribution etc. However, whenever a document or page is not properly aligned on the flatbed scanner, or the thickness of a book renders the page adjacent to the back of the book curved above the flatbed scanner, the scanned images transferred to the computer provides a deformed image of the text that is difficult to recognize in an OCR program as known in prior art.

In recent years, digital cameras have become an alternative to flatbed scanners due to the flexibility when using the camera. However, the problem with deformed text images for OCR processing in digital cameras is further enhanced since the misalignment of a camera image may occur in three dimensions (perspective distortion), even for pictures of flat pages. Lens faults like lens aberration and distortion may also influence the OCR efficiency.

A geometrical transformation of the deformed document image providing corrected images suitable for the OCR processing may solve the problem. The U.S. Pat. No. 6,304,313 disclose a digital camera with an OCR function based on dividing a document page into blocks, where each block is photographed before each block is processed by the OCR function. When all the blocks has been processed by the OCR function, the recognized blocks with text corresponding to the plurality of images are combined together to form one text data set corresponding to the whole document. However, the geometrical transformation according to this disclosure is merely to divide the page in such small blocks that the deformation in each small block is negligible. Therefore, this solution may require extensive processing to accomplish the task when the deformation exceeds a specific level. Further, the division of text may render the text in each block unrecognizable because the blocks are becoming too small to contain recognizable text.

The US patent application US 2003/0026482 from Feb. 6, 2003 disclose a method for correcting perspective distortion in a digital document image, for example from a digital camera, wherein a mathematical model of how parallel lines passes a single point when viewed under some perspective view is used to identify the perspective of the image. According to a preferred embodiment of this invention, horizontal and vertical border lines of an image comprising text is used to identify the perspective of the image. Based on this mathematical model of the distortion due to the perspective, text lines are corrected. As easily understood, this perspective based method do not cope with the other types of distortion readily encountered when for example a page in a book is photographed, and then passed through an OCR function.

Besides perspective distortions, structural distortions due for example to bending or curving of book pages adds significantly to the problem of correcting such images from cameras. It is also clear from practical experience when using a camera for capturing images of text, the camera usually is oriented straight ahead above the page to be photographed. Therefore, the perspective distortion will usually contribute less to the total distortions encountered in the image compared to for example structural distortions of the object (text page, bending of book pages, curving pages etc.) itself.

The paper "Correcting Document Warping based on regression of curved text lines" by Zhang and Tan, International Conference on Document Analysis and Recognition, ICADR-2003, disclose a method based on models of the text line deformations as quadratic polynomial curves instead of using a more common cylinder model for the book deformation near the back of the book as described above. The lines are tracked using a connected element clustering algorithm within bounding boxes defined by the orientation of an already identified segment of the text lines.

The paper "Document image de-warping for text/graphics recognition" by Wu and Agam, International Symposium on Statistical Pattern Recognition, SSPR-2002, disclose a method based on lines that are tracked using a local adaptive cumulative projection at different angles. The tracked lines may cross each other due to the local nature of the algorithm when two starting points result in two different search directions. A second step of removing lines that are crossing based on the average orientation of the lines is included, limiting the method to images with fairly regular lines and a small perspective distortion. A rectangular mesh is fitted to the remaining lines for dewarping.

The paper "Rectifying the bound document image captured by a camera: A model based approach" by Cao et. al., International Conference on Document Analysis and Recognition, ICADR-2003, disclose a method based on applying a cylinder model to the book deformation near the back of he book and a perspective model to compensate for the depth difference. A best match between the cylinder model and a set of threshold skeletons of the lines are used to rectify the images.

All of these above referenced papers disclose methods having clear limitations with respect to the type of geometric deformations that can be dewarped by these methods. The cylinder model and the quadratic polynomials will only fit the type of geometric deformations that is found in books with stiff book cover. The average orientation filtering requires that the text lines are fairly regular, which is found in the case with open books, and which also limits the methods to only small perspective deformations.

Therefore there is a need for a method and system providing better geometrical transformation of distorted images comprising text before processing images with an OCR function to achieve more reliable and more complete text recognition of documents in a computer system or digital camera system.

SUMMARY

According to an aspect of the present invention, text like information in an image may be identified and evaluated on basis of connected pixels that probably comprise text, and on basis of direction of connected pixels constituting text, a text line direction may be identified without any introduction of an a priori assumption or model of present document deformations. Based on the property that most text-lines are parallel and are relatively homogenous in size in actual documents, text-lines may be geometrically transformed providing aligned and parallel text lines that much more easily are handled by OCR programs, thereby providing more reliable and more complete recognition of images comprising text by said OCR program.

According to an example of embodiment of the present invention an image is reviewed to identify text like structures, and to make an assessment if the total text like structure comprised in the image is enough to extract text lines as basis for a geometrical transformation of the whole document, wherein potentially connected pixels that may form characters are identified and traced to form text lines providing points for a definition of transformation points on said text lines, wherein said transformation points are used for a geometrical transformation of said text lines or parts of said text lines, providing images comprising parallel and homogenous text lines as input for an OCR program.

BRIEF DESCRIPTION OF THE DRAWINGS

FIG. 2 depicts examples of connected pixels forming probable characters that are forming words.

DETAILED DESCRIPTION OF THE PREFERRED EMBODIMENTS

Figure 1:
FIG. 1 depicts an example of connected pixels forming a probable word.

According to an aspect of the present invention, in stead of establishing an a priori mathematical model of distortions in an image comprising text, the main issue is that pixels representing characters, character fragments (which may be natural due to typographical aspects of the text or artificial due to deformations), words or parts of words constitute connected pixels, wherein connected pixels related to characters are spaced apart by a distance defined by the typeface used (Times New Roman etc.), and wherein groups of connected pixels forming words are spaced by another distance defining distance between words on a text line, wherein it is possible to search an image to identify even deformed text lines based on said searching using for example said distances.

According to an aspect of the present invention, the objective of the present invention may be solved in a process comprising three basic steps:
a) performing an initial check to evaluate if there is enough text like structures in the images to perform a transformation according to the present invention,
b) identify connected pixels probably forming characters, words and searching said probable characters, words to identify transformation points,
c) based on said transformation points, transforming the image or a part of an image comprising text to an image where the text lines are straight and parallel, and homogenous in size.

According to an aspect of the present invention, a reference system providing a coordinate system for locating graphical elements, objects, characters etc. in an image may be defined by the plane provided by the flatbed scanner platen or the surface of the image capturing device, such as a digital camera, for example. However, any definition of a coordinate system may be used according to the present invention.

Any pixel in an image is therefore referable by an ordered set of coordinate values. Pixels related to an image of characters constituting text provides several attributes that may be used in OCR functions as known to a person skilled in the art. For example, the shape of characters may be identified providing means for recognizing characters, and then whole words, for example. Whenever there is a deformation of the image, the recognition is difficult as described above.

According to an example of embodiment of the present invention, the geometrical image transformation may be executed whenever there is enough information in the image to provide a transformation grid. According to the present example, an initial text check is performed analysing connected pixels to verify that they are consistent in size, shape and relative position consistent with text. For example, if images has insufficient resolution (character height below five to ten pixels, for example), insufficient text line structure (a single line or sparse words cannot be used to define a transformation grid), the image is rejected. In some instances, the text lines may extend outside the edges of the image.

Whenever such situations occur, they may be signaled back to users providing a possibility to correct the reason why the image does not provide sufficient information for the geometrical transformation according to the present invention. The signaling may be displaying a message to the user on a computer display. According to an example of embodiment of the present invention comprising a digital camera, the initial check provides a feedback signal as a green light whenever the initial analysis concludes with sufficient information. When the green light is not present the user may perform adjustments, for example changing camera position relative to the document the user at present is investigating, zooming into the image or moving the camera closer to the paper, book etc., or just by turning the viewing angle of the camera. When the green light comes on, the image may be captured to be processed by an OCR program running in the camera itself, or in an attached computer receiving the image from the camera.

According to the present example of embodiment, connected pixels are also measured to provide a ratio between area/height/width which must be higher than a lower threshold value, and below a higher threshold value. If said ratio is below said lower threshold, the pixels are regarded as noise or artifacts. If said ratio is above said higher threshold value, the pixels are regarded as being non-text elements or artifacts. Any set of connected pixels not falling between said lower and higher threshold values are rejected from being part of the geometric transformation. According to an example of embodiment of the present invention, a table is created identifying locations of such rejected sets of connected pixels.

Figure 2:
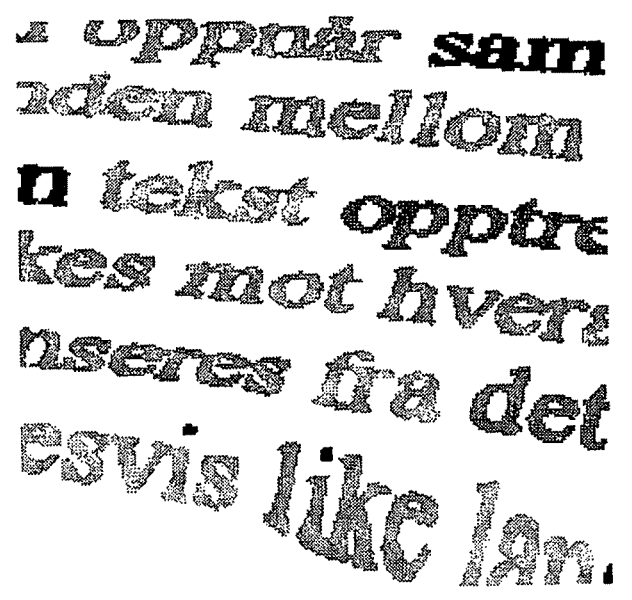
Figure 3:
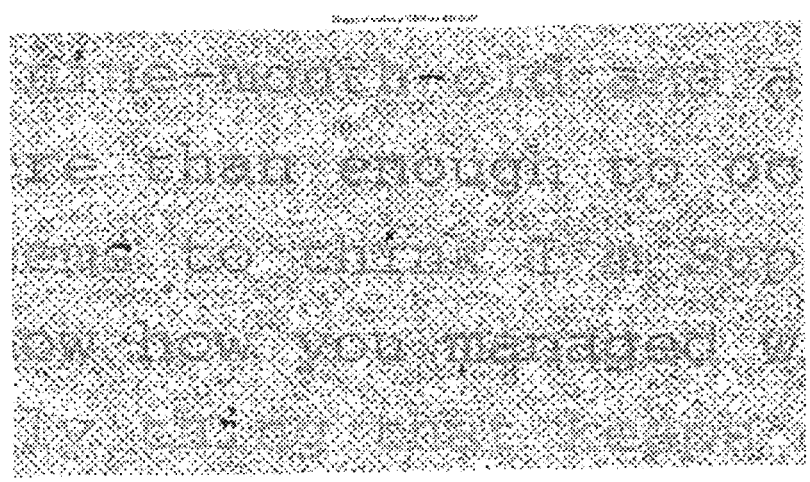
FIG. 3 illustrates an image of a document page comprising slight deformation.

FIG. 1 illustrates an example of an image comprising an inclined word "city". Pixels constituting a character is a connected set of pixels as outlined above, wherein the connectivity is provided for example in a four-way direction as a north-south-west-east connected set of pixels (or up, down, left, right), or in an eight-way manner that in addition to the north-south-west-east directions also comprise the diagonals. The denominations of directions are merely a convenient way of assigning different directions rather than being actual directions. However, directions related to a reference system based on the flat bed scanner platen for example, provide an orientation as north, south etc. or up, down etc. that is easily comprehended and easy to implement as computer program routine. Based on these rules for connectivity, an analysing routine may be programmed, as known to a person skilled in the art, to provide an identification of connected pixels. In FIG. 1, the letter 'c' is a connected set of pixels using any rule of connectivity. The letter 'i' comprises two sets of connected pixels, the stem and the dot using any of the connectivity rules. The letters 't' and 'y' comprises two sets of connected pixels when using the four-way rule, while they are one set of connected pixels when applying the eight-way rule. In FIG. 2 another example of connected pixels forming words are illustrated. FIG. 2 also illustrates the problem sometimes encountered in OCR when deformations change the size of characters. According to an aspect of the present invention such changed character heights may be rejected by said test of said ratio of area/height/width as described above. FIG. 3 depicts an example of an image of text with a back ground making it difficult to distinguish pixels from the background. Whenever such situations arise, it may be signaled back to users, providing adjustments for example of scanner parameters etc. that may improve the quality of the images to be processed.

When the initial analysis concludes that an image provides sufficient information to be used in a geometrical transformation, according to the present invention, the image under investigation is searched to identify possible text lines. According to an example of embodiment the image is first searched to measure distances between connected pixels. The distance is measured as a count of pixels or space between the connected pixels. The search is performed in a plurality of directions. In the present example of embodiment, the measured distances are assembled in a histogram where the x-axis represent distance measured in pixels and the y-axis is the count of each measured distance. Since any document comprising text provides a first distinct distance between characters, and another second distinct distance between words, the histogram provides to distinct columns representing the count of each of said distinct distances. In this manner identified connected pixels may be interlinked or clustered in any direction searched in the image to identify any identifiable collection or clustering of connected pixels as being probable words based on said distinct distances. In an example of embodiment of the present invention, locations of connected pixels being probable words are listed in a table, one entry for each probable word. The locations listed in said table may be compared with the list of rejected pixels identified in the initial analysis as described above. Any pixels being listed as rejected is removed from said table. In this manner the relationship between locations of characters listed in an entry in said table representing a probable word provides a direction of the text line on the location on the text line the present probable word is located, wherein said direction is relative to the coordinate system used. As known to a person skilled in the art, the locations listed in said table may be relative coordinates.

In yet another example of embodiment of the present invention, other parameters in addition to distance characterising characters and words are used. For example, size of connected pixels should also reflect that same characters in the same font set actually have similar size. In this manner size and/or directions (i.e. height-width relationship of characters) may be used to form homogeneity criteria providing a tool to further increase the probable detection of words. In an example of embodiment of the present invention, any known method of geometric sorting may be used to cluster connected pixels, for example range searching algorithms. In yet another example of embodiment, the relationship between heightwidth of clustered connected pixels is used to identify the local text line direction for the probable word.

According to an aspect of the present invention, a word on a text line is probably followed by a next probable word spaced with said second distinct distance. By searching the image in a plurality of directions, following words apart from a selected word with said second distinct distance, an example of embodiment of the present invention provides a listing of candidates that may be linked together to identify a text line.

In yet another embodiment of the present invention, other parameters in addition to distance characterising words are used to identify said candidates. For example, the heightwidth relationship between clustered connected pixels may be sorted to identify probable long words providing a more probable identification of direction of said text lines.

According to an example of embodiment of the present invention, candidates linked to probable text lines are sorted and grouped to form text blocks based on their mutual distance and position in the image. According to the present example of embodiment, the consistency of the identified text lines are then investigated, for example by investigating if any text lines are crossing each other, or if that they are discontinuous.

Figure 4:
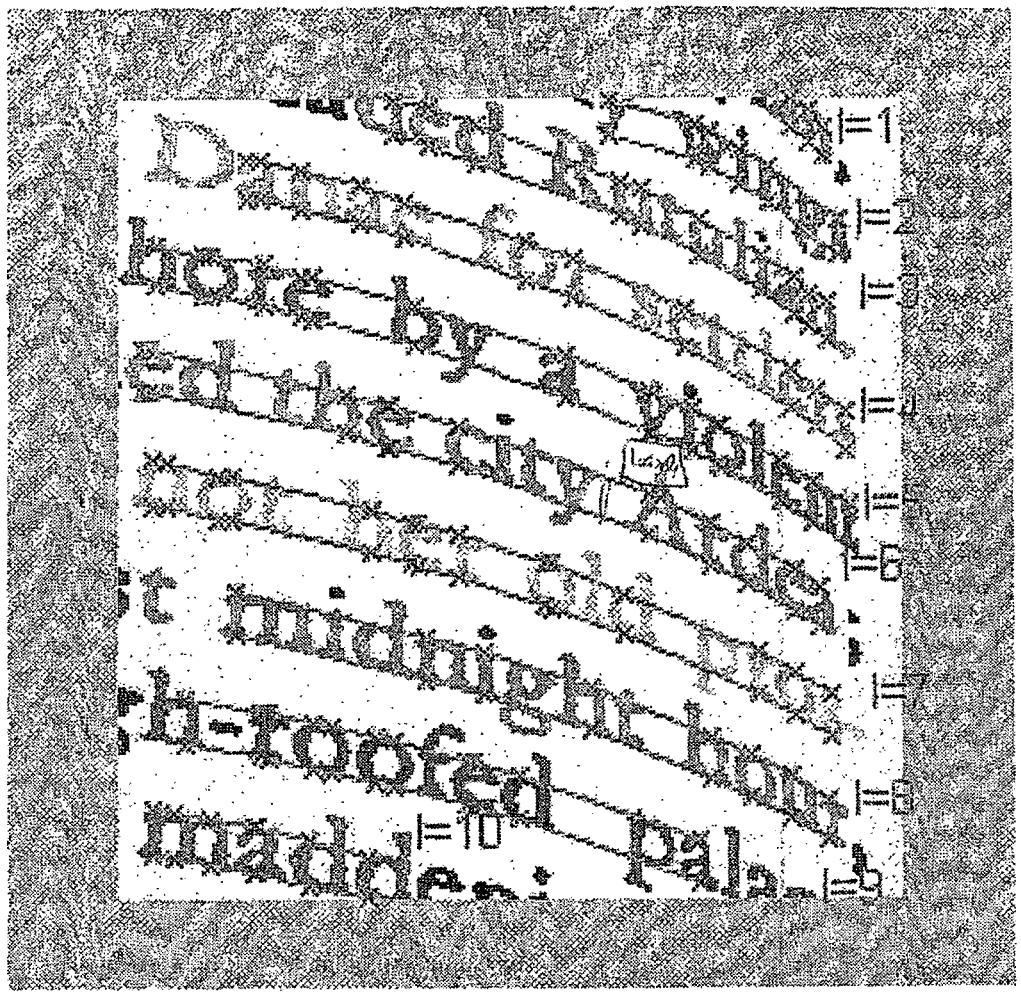
FIG. 4 illustrates text line tracking according to an example of embodiment of present invention.

FIG. 4 illustrates text line tracking according to an example of embodiment of present invention. Based on the requirement that a font set provides similar height for connected pixels constituting characters, staff-lines interconnecting characters on a text line may be introduced. Intersections between staff-lines and connected pixels may provide points in the image that may be used for the geometrical transformation. Such selected points are marked with crosses in FIG. 4.

Figure 5:
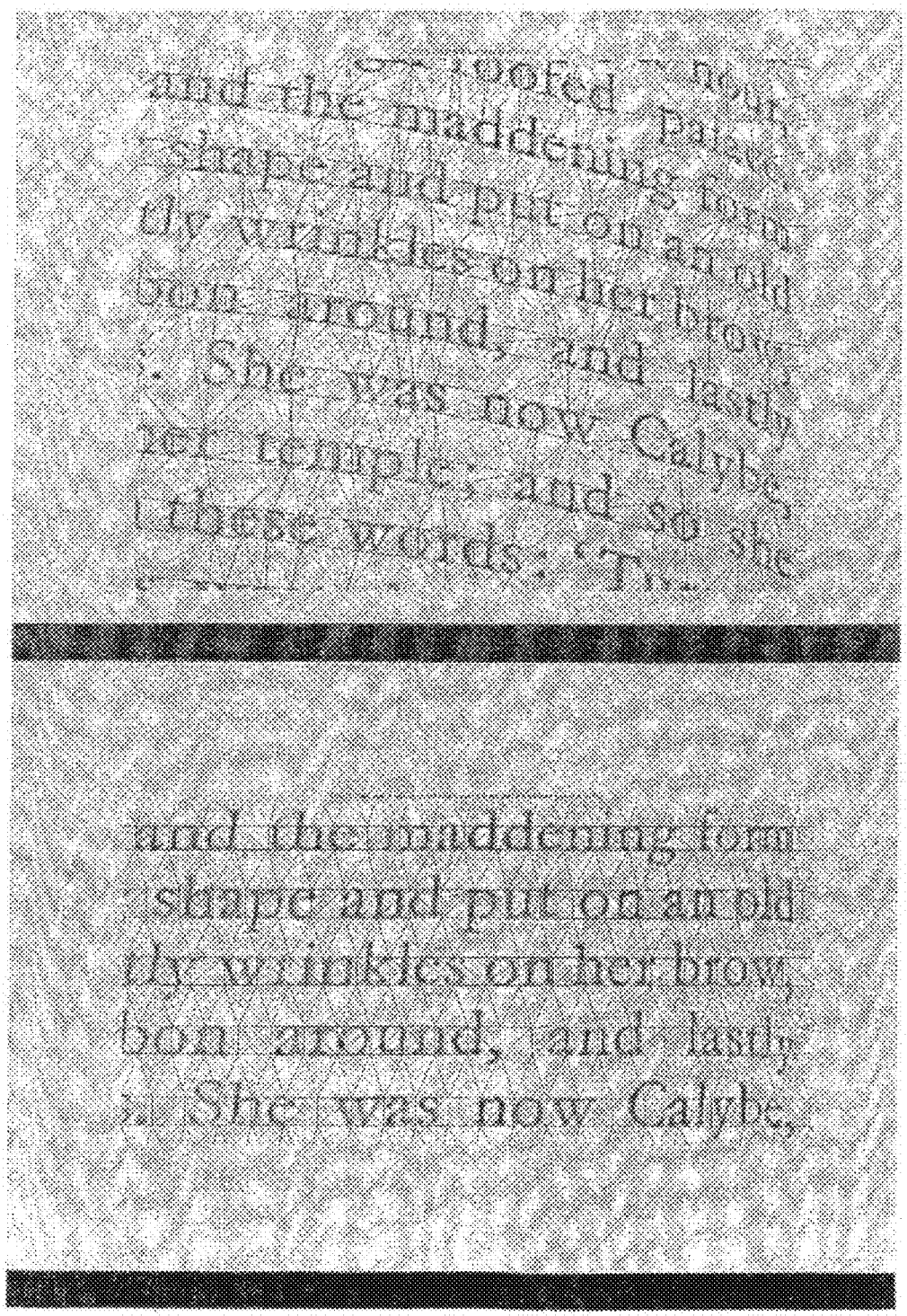
FIG. 5 illustrates an example of meshes for forward and inverse geometric morphing transformation according to an example of embodiment of present invention.

FIG. 5 illustrates an example of meshes for forward and inverse geometric morphing transformation according to an example of embodiment of present invention. The morphing may be performed as known to a person skilled in the art. According to an aspect of the present invention, any type of transformation may be used.

Figure 6:
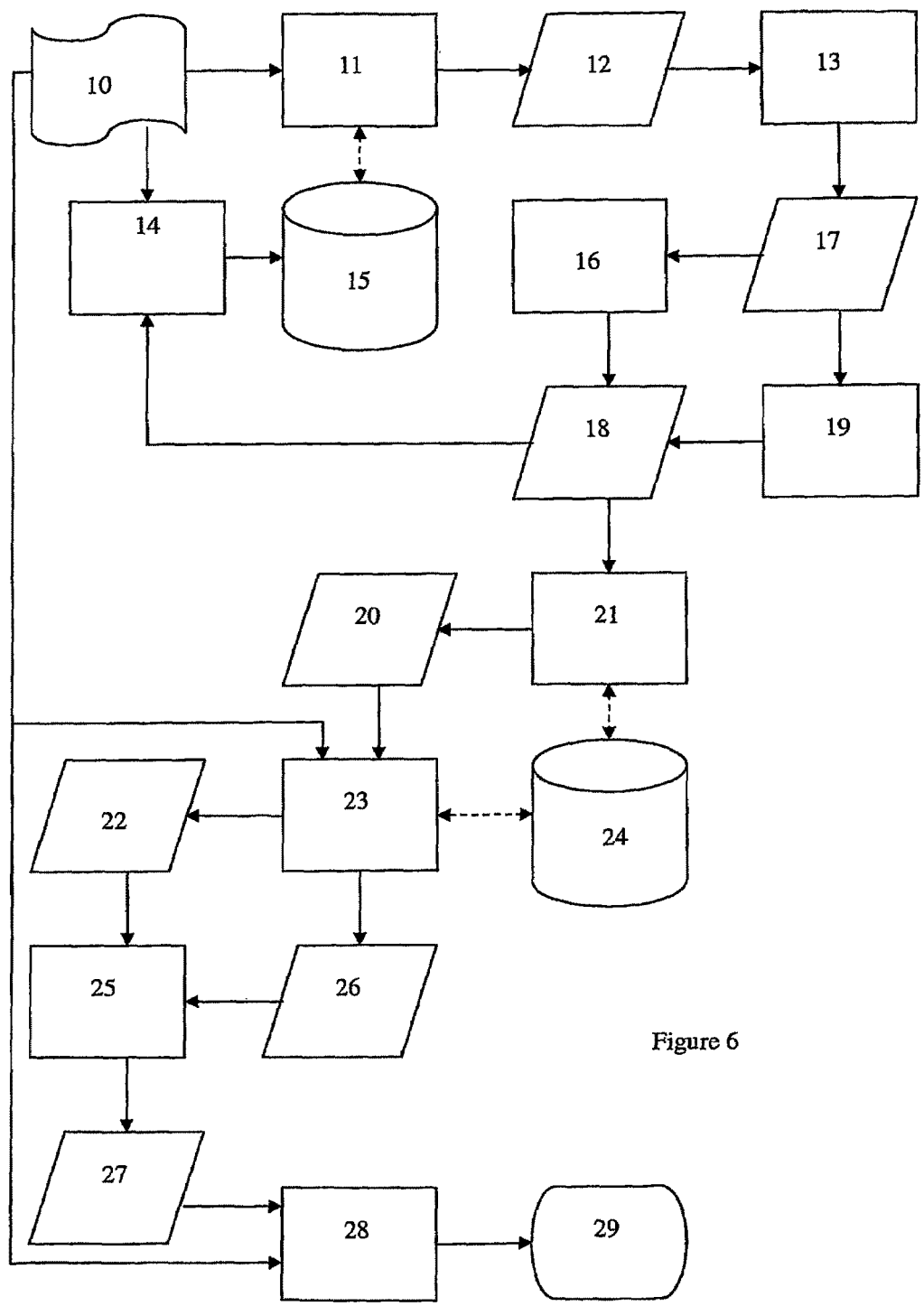
FIG. 6 depicts a flow diagram of an example of embodiment of present invention.

FIG. 6 depicts a flow diagram illustrating a preferred example of embodiment of the present invention in a computer program running in a computer system or in a processor element comprised in a digital camera. An image 10 is communicated to a quality measuring module 14. The purpose of the quality measuring module is to provide an initial analysis of the image to assess if there is sufficient information in the image 10 to perform the geometrical transformation according to the present invention, as described above. Parameters are stored in a storage location 15 providing a possibility to adjust parameters to improve the quality of the image 10, if necessary. The threshold module 11 receives parameters from the storage location 15 providing a bitmap 12 of the image 10 with reduced noise, as known to a person skilled in the art. The bitmap 12 is communicated to the module 13 providing an identification of connected pixels, as described above. Identified connected pixels are analyzed and sorted in module 17. Module 19 identifies single connected pixels as words while module 16 is clustering connected pixels to probable words as described above. Output from module 16 and 19 are communicated to the module 18 providing a consistency check of words. Results from the consistency check is communicated back to the quality measuring module 14 resulting in a possible adjustment of parameters stored in the storage location 15. Words are communicated from module 18 to module 21 providing linking of words to candidate text-lines as described above. A consistency check may be performed in module 20 which communicates text-line candidates to document analysis module 23. On basis of the image 10, document analysis module 23 is providing for example staff-lines as described above in the image 10. An example of alternative embodiment provides a module 24 comprising a model description of text, for example based on knowledge about fonts that are used in the present image. The document analysis 23 provides text blocks 26 that is combined with document layout 22, where module 25 extracts the geometry in the image 10 that is used to identify transformation points 27, as described above. The actual transformation is performed in module 28 outputting the transformed image 29, which is communicated to an OCR program as known to a person skilled in the art.

According to the present invention, deformed text lines may be corrected to provide straight and parallel text lines providing more reliable recognition of text in OCR programs with no a priori knowledge of images, or by a priori geometrical modeling of deformations. A computer program executing the steps of a method according to the present invention may be incorporated in a standard OCR program running in a computer system or programmable device receiving images of documents from an attached scanner, or from a digital camera transferring said images to said computer system, for example via wire transfer, or via wireless communication such as Bluetooth, for example. According to another embodiment of the present invention, said method may be executed in a program or programmable device running in such a processor element comprised in said camera. According to yet another embodiment of the present invention, said method may be implemented as an ASIC (Application Specific Integrated Circuit), as known to a person skilled in the art, in a digital camera or in any another type of equipment. Said digital camera may be implemented in a mobile telephone, or any other type of mobile wireless user equipment.

The invention claimed is:

1. Method for geometrical transformation of a deformed image comprising text by searching text-lines in the image, comprising the steps of:
 a) performing an initial analysis to evaluate if there is enough text-like structures in the image to perform the transformation,
 b) identifying connected pixels probably forming characters, words and searching the probable characters, words to identify a direction of each probable character, word reflecting the direction of text-lines, staff-lines or similar elements constituting a direction of text-lines at each of the respective positions in the image that comprise each of the identified connected pixels forming characters, words and measuring distances between connected pixels providing a first distinct distance related to spacing between characters, and a second distinct distance related to spacing between words
 c) identifying a direction of the text-lines based on a clustering of connected pixels reflecting the direction of a local text-line on a location on the text-line wherein the clustering of the connected pixels are located,
 d) sorting the local text line directions into text lines based on the second distinct distance spacing the words,
 e) comprising identifying long words by sorting height-width relationship between clustered connected pixels, and using the long words as basis for sorting the local text line directions,
 f) linking together identified directions of adjacent identified connected pixels thereby identifying text lines, staff-lines or similar elements constituting a direction of a text lines across the complete or part of the complete image area, identifying transformation points related to the linked direction of text lines across the image area,
 g) based on the transformation points, transforming the image or a part of the image comprising the text to an image where the text lines are straight and parallel.

2. System implemented in a programmable computer system or device providing geometrical transformation of a deformed image comprising text, by searching text-lines in the image, comprising:
 e) a program module performing an initial analysis to evaluate if there is enough text-like structures in the image to perform the transformation,
 f) a program module: identifying connected pixels probably forming characters, words and searching the probable characters, words to identify a direction of each probable character, word reflecting the direction of text-lines, staff-lines or similar elements constituting a direction of text-lines at each of the respective positions in the image that comprise each of the identified connected pixels forming characters, words; measuring distances between connected pixels providing a first distinct distance related to spacing between characters, and a second distinct distance related to spacing between words; identifying a local text line direction based on the clustering of connected pixels reflecting the direction of the text line on a location on the text line wherein the clustering of the connected pixels are located; sorting the local text line directions into text lines based on the second distinct distance spacing the words; and identifying long words by sorting height-width relationships between clustered connected pixels, and using the long words as basis for sorting the local text line directions,
 g) a program module linking together identified directions of adjacent identified connected pixels thereby identifying text lines, staff-lines or similar elements constituting a direction of a text lines across the complete or part of the complete image area, identifying transformation points related to the linked direction of text lines across the image area, and
 h) a program module that based on the transformation points is transforming the image or a part of the image comprising the text to an image where the text lines are straight and parallel.

3. Digital Camera comprising programmable device executing a program for geometrical transformation of deformed image comprising text, by searching text-lines in the image, comprising:
 i) a program module identifying connected pixels probably forming characters, words and searching the probable characters, words to identify a direction of each probable character, word reflecting the direction of text-lines, staff-lines or similar elements constituting a direction of text-lines at each of the respective positions in the image that comprise each of the identified connected pixels forming characters, words,
 j) a program module: linking together identified directions of adjacent identified connected pixels thereby identifying text lines, staff-lines or similar elements constituting a direction of a text lines across the complete or part of the complete image area, identifying transformation points related to the linked direction of text lines across the image area; measuring distances between connected pixels providing a first distinct distance related to spacing between characters, and a second distinct distance related to spacing between words; identifying a local text line direction based on a clustering of connected pixels reflecting the direction of the text line on a location on the text line wherein the clustering of the connected pixels are located; sorting the local text line directions into text lines based on the second distinct distance spacing the words; and identifying long words by sorting height-width relationships between clustered connected pixels, and using the long words as basis for sorting the local text line directions.

k) a program module that based on the transformation points is transforming the image or a part of the image comprising the text to an image where the text lines are straight and parallel.

4. ASIC (Application Specific Integrated Circuit) comprising electronic circuitry for geometrical transformation of deformed image comprising text, by searching text-lines in the image, comprises:

l) electronic circuitry identifying connected pixels probably forming characters, words and searching the probable characters, words to identify a direction of each probable character, word reflecting the direction of text-lines, staff-lines or similar elements constituting a direction of text-lines at each of the respective positions in the image that comprise each of the identified connected pixels forming characters, words, m) electronic circuitry: linking together identified directions of adjacent identified connected pixels thereby identifying text lines, staff-lines or similar elements constituting a direction of a text lines across the complete or part of the complete image area, identifying transformation points related to the linked direction of text lines across the image area; measuring distances between connected pixels providing a first distinct distance related to spacing between characters, and a second distinct distance related to spacing between words; identifying a local text line direction based on a clustering of connected pixels reflecting the direction of the text line on a location on the text line wherein the clustering of the connected pixels are located; sorting the local text line directions into text lines based on the second distinct distance spacing the words; and identifying long words by sorting height-width relationships between clustered connected pixels, and using the long words as basis for sorting the local text line directions, and n) electronic circuitry that based on the transformation points is transforming the image or a part of the image comprising the text to an image where the text lines are straight and parallel.

* * * * *